United States Patent
Kanekiyo et al.

(10) Patent No.: US 6,168,673 B1
(45) Date of Patent: Jan. 2, 2001

(54) SHEET MAGNET HAVING MICROCRYSTALLINE STRUCTURE AND METHOD OF MANUFACTURING THE SAME, AND METHOD OF MANUFACTURING ISOTROPIC PERMANENT MAGNET POWDER

(75) Inventors: Hirokazu Kanekiyo, Kyoto; Satoshi Hirosawa, Otsu, both of (JP)

(73) Assignee: Sumitomo Special Metals Co., Ltd., Osaka (JP)

(*) Notice: Under 35 U.S.C. 154(b), the term of this patent shall be extended for 0 days.

(21) Appl. No.: 09/284,604

(22) PCT Filed: Oct. 16, 1997

(86) PCT No.: PCT/JP97/03725

§ 371 Date: May 20, 1999

§ 102(e) Date: May 20, 1999

(87) PCT Pub. No.: WO98/18141

PCT Pub. Date: Apr. 30, 1998

(30) Foreign Application Priority Data

Oct. 18, 1996 (JP) .................................................. 8-297176

(51) Int. Cl.[7] ...................................................... H01F 1/053

(52) U.S. Cl. ........................... 148/122; 164/463; 164/475; 164/477

(58) Field of Search ..................... 148/101, 121, 148/122; 164/463, 475, 477

(56) References Cited

U.S. PATENT DOCUMENTS

| | | | |
|---|---|---|---|
| 4,496,395 | * | 1/1985 | Croat .................................. 148/101 |
| 4,921,553 | * | 5/1990 | Tokunga et al. .................... 148/302 |
| 5,056,585 | * | 10/1991 | Croat .................................. 164/463 |
| 5,172,751 | * | 12/1992 | Croat .................................. 148/101 |
| 5,174,362 | * | 12/1992 | Croat .................................. 164/463 |
| 5,309,977 | * | 5/1994 | Yoneyama et al. .................. 164/463 |
| 5,665,177 | * | 9/1997 | Fukuno et al. ...................... 148/101 |

FOREIGN PATENT DOCUMENTS 4-229602 * 8/1992 (JP) .
7-157804 * 6/1995 (JP) .

* cited by examiner

Primary Examiner—John Sheehan
(74) Attorney, Agent, or Firm—Dykema Gossett PLLC

(57) ABSTRACT

An object of this invention is to provide a thin-film magnet having a residual magnetic flux density Br of not less than 10 kG, a cost performance equal to that of a hard ferrite magnet, and a thickness of 70–300 μm contributing to the miniaturization and thinning of a magnetic circuit, and a method of manufacturing the same. When a molten alloy of a predetermined structure having a small content of a rare earth element is subjected to continuous casting using a cooling roll in an inert gas atmosphere with reduced pressures of not more than 30 kPa at a predetermined peripheral speed of the roll, it turns into a crystalline structure substantially not less than 90% of which comprises a $Fe_3B$ type compound and a compound phase having α—Fe and $Nd_2Fe_{14}B$ type crystalline structures compatible with the former. A continuous thin-film magnet of 70–300 μm in thickness comprising a microcrystalline structure of 10–50 nm in average crystal grain diameter having magnetic characteristics of iHc≧2 kOe, Br≧10 kG and practically usable as a permanent magnet can be obtained. A thin-film magnet which has heretofore been difficult to be industrially produced can be mass-produced at a low price by a simple method.

6 Claims, 1 Drawing Sheet

SHEET MAGNET HAVING MICROCRYSTALLINE STRUCTURE AND METHOD OF MANUFACTURING THE SAME, AND METHOD OF MANUFACTURING ISOTROPIC PERMANENT MAGNET POWDER

DESCRIPTION

Thin-Film Magnet Having a Fine Crystal Structure and Manufacturing Method Thereof; Manufacturing Method for Isotropic Permanent Magnet Powder 1. Technical Field The present invention relates to a thin-film magnet optimal for use in various types of small motors, actuators, and magnetic circuits for magnetic sensors, and a method for its manufacture. More particularly, the present invention relates to a thin-film magnet having magnetic properties of iHc$\geq$2 kOe and Br$\geq$10 kG and having a crystal structure wherein substantially 90% or more of the crystal structure comprises FeB compounds coexisting with compound phases having $\alpha$—Fe and $Nd_2Fe_{14}B$ crystal structures and which comprises a fine crystal structure having the mean crystal grain diameter of 10 nm–50 nm in each compound phase. The invention also relates to a method for manufacturing the thin-film magnet directly by continuous casting of thin sheets of alloy, with thicknesses of 70$\mu$m to 300$\mu$m, through the casting of an alloy melt with a specific composition, including 5 at % or less of rare earth elements and 15 to 30 at % of boron, in an inert gas atmosphere at a specific reduced pressure on rotating cooling rollers.

2. Background Art

Current requirements for household appliance, office equipment, and other electronics equipment include higher capacities, as well as smaller sizes and lighter weights. Designs for whole magnetic circuits using permanent magnets are being studied for the purpose of maximizing performance/weight ratio. In particular, permanent magnets with residual magnetic flux densities Br of 5 kG to 7 kG are optimal for use in the structure of dc brush motors, which make up more than half of current production figures. Such residual magnetic flux densities cannot be achieved with conventional hard ferrite magnets.

For example, Nd—Fe—B sintered magnets and Nd—Fe—B bonded magnets, which consist mainly of $Nd_2Fe_{14}B$, do have the requisite magnetic properties. However, these include 10 to 15 at % of Nd, for which the isolation and refining of the metal and reducing reactions require many steps and large scale facilities. These are therefore considerably more expensive than hard ferrite magnets and, in view of cost performance, only replace hard ferrite magnets in some instruments. Inexpensive permanent magnet materials having Br of 5 kG or more have yet to be discovered.

Also, small, thin magnetic circuits require that the permanent magnet itself be in the form of a thin sheet, 100 $\mu$m to 500 $\mu$m thick. With Nd—Fe—B sintered magnets, it is difficult to attain bulk material with thicknesses of 500 $\mu$m or less. These can therefore only be prepared by grinding, which greatly increases costs. Nd—Fe—B bonded magnets are made by bonding powder with thicknesses of 30 $\mu$m and diameters of 10 $\mu$m to 500 $\mu$m in resin, making it difficult to form magnets with thicknesses of 100 $\mu$m to 300 $\mu$m.

Meanwhile, magnetic materials comprising mainly $Fe_3B$ compounds in compositions approaching $Nd_4Fe_{77}B_{19}$ (at %) have been proposed as Nd—Fe—B magnets in recent years (R. Coehoorn et al., J. de Phys, C8, 1988, p. 669–670). The technical details thereof were disclosed in U.S. Pat. No. 4,935,074. Prior to that, Koon proposed in U.S. Pat. No. 4,402,770 a method for manufacturing permanent magnets comprising fine crystals by crystallizing heat treatment of La—R—B—Fe amorphous alloys, including La as an essential element.

More recently, as disclosed in European Patent No. 558691B1, Richter et al. reported that thin fragments having hard magnetic properties were attained by heat treatment at 700° C. of amorphous flakes attained by spraying an Nd—Fe—B—V—Si alloy bath, including 3.8 to 3.9 at % of Nd, on a rotating Cu roller. These permanent magnet materials are permanent magnet materials with metastable crystal structures including a blend of a soft magnetic $Fe_3B$ phase and a hard magnetic $R_2Fe_{14}B$ phase, attained by crystallizing heat treatment of amorphous flakes with thicknesses of 20 $\mu$m to 60 $\mu$m.

Such permanent magnet materials have iHc of 2 kOe to 3 kOe and Br of 10 kG. Because the composition includes only 4 at % of expensive Nd, the raw materials are cheaper than those for an Nd—Fe—B magnet comprising mostly $Nd_2Fe_{14}B$. On the other hand, the liquid quenching conditions are restricted because the amorphous alloying of the raw materials is a necessary condition. Also the heat treatment conditions for attaining hard magnetic materials are narrowly restricted. This is therefore not practical in an industrial manufacturing setting and these magnets cannot be provided as inexpensive replacements for hard ferrite magnets. Because such permanent magnet materials are attained by crystallizing heat treatment of amorphous flakes with thicknesses of 20 $\mu$m to 60 $\mu$m, it is not possible to attain permanent magnets with the 70 $\mu$m to 300 $\mu$m thicknesses required of thin-film magnets.

On the other hand, for the quenched Nd—Fe—B magnetic materials in U.S. Pat. Nos. 4,802,931 and 5,056,585 and so forth, the crystal structures are attained directly by quenching methods, so crystallizing heat treatment is not necessary. However, the optimum peripheral speed of the rollers disclosed in those reports was 20 m/s; the thickness of the quenched alloy flakes attained under those conditions is only about 30 $\mu$m and these cannot be used as thin-film magnets. These are therefore pulverized to diameters of several tens to 500 $\mu$m and used in the bonded magnets discussed above.

SUMMARY OF THE INVENTION

It is an object of the present invention to provide a thin-film magnet and a method for the production thereof, such a thin-film magnet having a fine crystal structure with a thickness of 70 $\mu$m to 300 $\mu$m (thus contributing to the miniaturization of magnetic circuits), having a cost performance rivaling that of hard ferrite magnets and a residual magnetic flux density Br of 10 kG or more, and resolving the abovementioned problems with Nd—Fe—B magnets having fine crystal structures and containing 5 at % or less of rare earth elements.

The inventors performed various studies with the object of creating thin-film magnets of Nd—Fe—B permanent magnets with low concentrations of rare earth elements and wherein soft magnetic phases and hard magnetic phases are blended. As a result, they made the following discoveries and arrived at the present invention. They found that they could use continuous casting to attain thin-film magnet of continuously cast alloy with thicknesses of 70 $\mu$m to 300 $\mu$m and having fine crystal structures with the mean crystal grain diameter of each component phase being 50 nm or less, wherein 90% or more of the crystal structure comprises Fe$_3$B compounds coexisting with compound phases having α —Fe and Nd$_2$Fe14B crystal structures. The method involves continuous casting of an alloy melt, having a specific composition with low content of rare earth elements, in an inert gas atmosphere with reduced pressures of 30 kPa or less on a single cooling roller or between a pair of rollers rotating at a specific peripheral speed. Furthermore, they found that magnetic properties of iHc≧2 kOe and Br≧10 kG were achieved when the mean crystal grain diameters of each phase composing the continuously cast alloy attained were 10 nm to 50 nm. Moreover, they found that, in the case of crystalline metal structures with mean crystal grain diameters of less than 10 nm, they could use a specific heat treatment with the object of grain growth to attain mean crystal grain diameters of 10 nm to 50 nm for each phase and magnetic properties of iHc≧2 kOe and Br≧10 kG.

Specifically, the present invention is a thin-film magnet having a fine crystal structure, magnetic properties of iHc≧2 kOe and Br≧10 kG, and thicknesses of 70 μm to 300 μm, comprising fine crystals with mean crystal grain diameters of 10 nm to 50 nm, wherein 90% or more of the crystal structure comprises Fe$_3$B compounds coexisting with compound phases having α —Fe and Nd$_2$Fe$_{14}$B crystal structures; the composition of which is expressed as Fe$_{100-x-y}$B$_x$R$_y$ (R is one or two types of Pr, Nd, or Dy) where the symbols x and y specifying the range of the composition satisfy the following values:

15≦x≦30 at %

1≦y≦5 at %

Also, the present invention relates to a method for manufacturing a thin-film magnet with a fine crystal structure, for directly attaining permanent magnets having magnetic properties of iHc≧2 kOe and Br≧10 kG, thicknesses of 70 μm to 300 μm, and comprising fine crystals with mean crystal grain diameters of 50 nm or less, wherein 90% or more of the crystal structure comprises Fe$_3$B compounds coexisting with compound phases having α —Fe and Nd$_2$Fe$_{14}$B crystal structures; such a method comprising continuous casting in an inert gas atmosphere at reduced pressures of 30 kPa or less, on a single cooling roller or between a pair of rollers rotating at a specific peripheral speed, of an alloy melt, the composition of which is expressed as Fe$_{100-x-y}$ B$_x$ R$_y$ (R is one or two types of Pr, Nd, or Dy) where the symbols x and y which specify the range of the composition satisfy the above-mentioned values.

Also, the present invention is the above-mentioned manufacturing method for a thin-film magnet having a fine crystal structure, for attaining a permanent magnet having magnetic properties of iHc≧2 kOe and Br≧10 kG and comprising a fine crystalline alloy with mean crystal grain diameters of 10 nm to 50 nm; such a method comprising heat treatment in the temperature range of 500° C. to 700° C. with the object of crystal growth, when the alloy melt forms fine crystals with mean crystal grain diameters of 10 nm or less, following the quenching of the cast alloy with a thickness of 70 μm to 300 μm.

Also, the inventors propose combination with a manufacturing method for a thin-film magnet machined to a prescribed form by die cutting the thin-film magnet, being a permanent magnet with a thickness of 70 μm to 300 μm and having the above-mentioned magnetic properties of iHc≧2 kOe and Br≧10 kG.

Furthermore, at the same time, the inventors propose a manufacturing method for an isotropic permanent magnet powder having the magnetic properties of iHc≧2 kOe and Br≧7 kG and which is prepared by pulverizing the scraps of the thin-film magnet to mean grain diameters of 3 μm to 500 μm, after the die cutting of the above-mentioned thin-film magnet to a prescribed form.

BEST MODE FOR CARRYING OUT THE INVENTION

Figure 1:
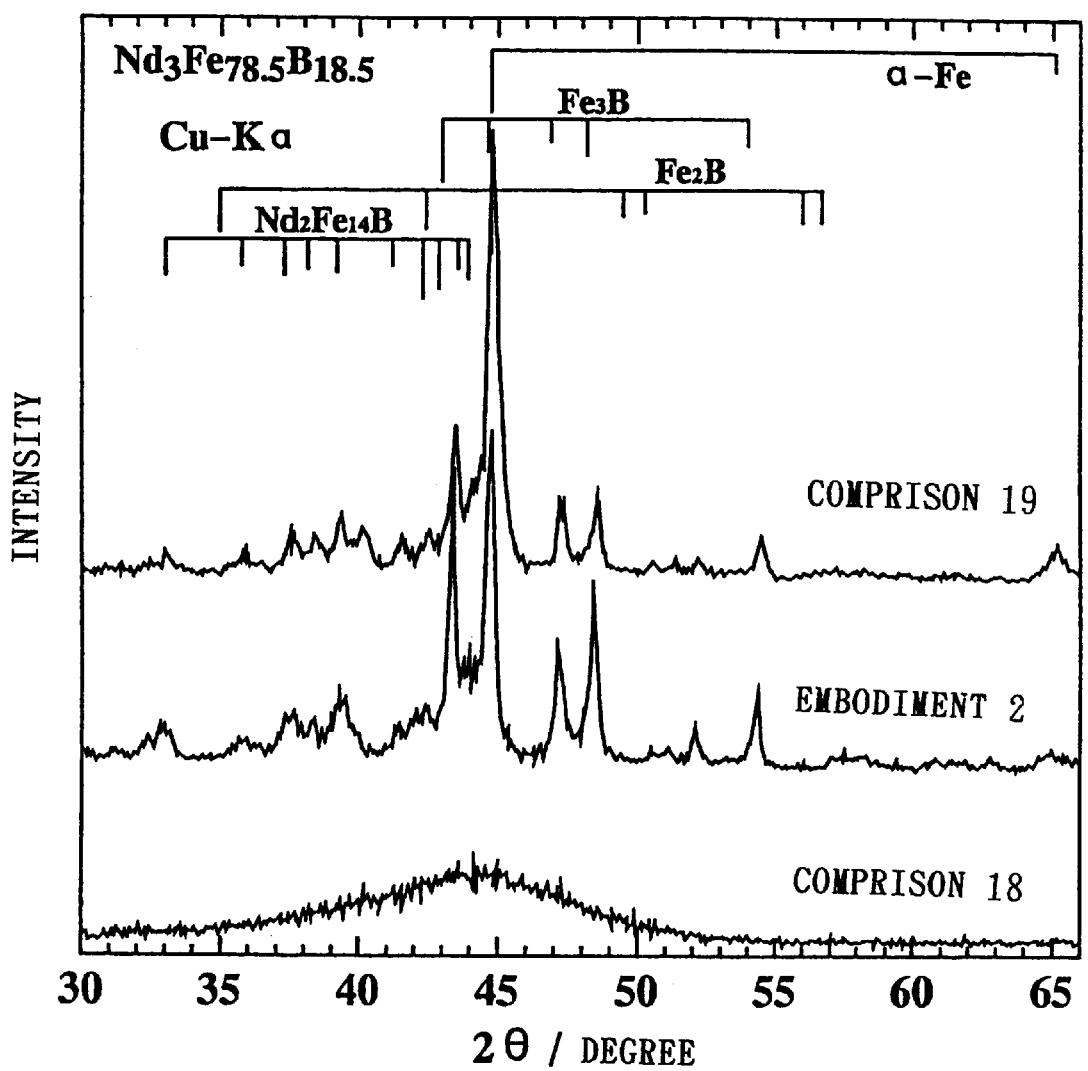
FIG. 1 is a graph showing the characteristic Cu—K α X-ray diffraction pattern for samples in the embodiment.

The specifics of the structure of the thin-film magnet of the present invention will now be explained.

Strong magnetic characteristics are attained only when a rare earth element R comprises a specific quantity of one or two types of Pr, Nd, or Dy. Properties such as iHc of 2 kOe or more are not attained with other rare earth materials such as Ce and La. Also, except for Tb and Dy, medium and heavy rare earth elements beyond Sm are not preferable because they add to costs and bring about deteriorating magnetic properties.

R is preferably in a range of 1 at % to 5 at %. If less than 1 at %, iHc of 2 kOe or more cannot be attained; and if greater than 5 at %, Br of 10 kG or more is not attained. A range of 2 at % to 5 at % is more desirable.

When B is less than 15 at %, α —Fe precipitation is marked in metal structures following liquid quenching and only iHc of less than 1 kOe is attained because the precipitation of compounds having the Nd$_2$Fe$_{14}$B crystal structure necessary for the manifestation of coercive force is blocked. When greater than 30 at %, the angularity of the demagnetization curve decreases markedly and Br of 10 kOe or more is not attained. Therefore, B is preferably in the range of 15 at % to 30 at %. A range of 17 at % to 20 at % is better.

Fe makes up the remainder of the abovementioned elements. Replacing part of the Fe with Co makes the metal structure finer; moreover, the angularity of the demagnetization curve is improved, as well as the maximum energy product (BH)max and heat resistance. Such effects are not attained if the substitution amount is less than 0.1% of Fe and if greater than 50%, Br of 10 kG is not attained. The substitution amount of Co in relation to Fe is therefore in the range of 0.1% to 50%, and preferably 0.5% to 10%. The iHc is improved by substituting 0.1 to 7 at % of Cr. The angularity of the demagnetization curve is improved and Br and (BH)max can be increased by substituting Fe with one or two types of the following with the total substitution amount being 0.05 at % to 2 at %: Al, Si, S, Ni, Cu, Zn, Ga, Ag, Pt, Au, Pb.

The specifics of the conditions for manufacturing the thin-film magnet according to the present invention are explained.

In the present invention, an alloy melt with the above-mentioned specific composition is cast in an inert gas atmosphere with reduced pressures of 30 kPa or less, on a rotating, single cooling roller or between a pair of rollers at a specific peripheral speed. This casting process produces a continuously cast alloy, with thicknesses of 70 μm to 300 μm and wherein substantially 90% or more of the crystal structure comprises Fe$_3$B compounds coexisting with compound phases having α —Fe and Nd$_2$Fe$_{14}$B crystal structures. Moreover, it is most important for manufacturing thin-film magnets that the mean crystal grain diameter of each component phase be the 10 nm to 50 nm microcrystalline structure necessary to attain magnetic properties of iHc≧2 kOe and Br≧10 kG.

During the continuous casting of the alloy melt, the pressure of the atmosphere is specified as characteristic to the present invention. When the casting atmosphere is 30 kPa or greater, gas gets between the cooling roller and the alloy melt and causes a loss of uniformity in the quenching conditions for the cast alloy, which then has a metal structure including coarse α —Fe and with which magnetic properties of iHc≧2 kOe and Br≧10 kG are not attained. The alloy quenching atmosphere is therefore 30 kPa or less and preferably 10 kPa or less. The atmospheric gas is an inert gas in order to prevent oxidation of the alloy melt and is preferably argon.

In the above-mentioned continuous casting method, heat treatment with the object of grain growth may be carried out when the mean crystal grain diameter of the cast alloy is not the 10 nm to 50 nm mean crystal grain diameter necessary to attain the magnetic properties of iHc≧2 kOe and Br≧10 kG. If the heat treatment temperature is less than 500° C., grain growth does not occur and mean crystal grain diameters of 10 nm or not are not attained. If greater than 700° C., grain growth is marked, but iHc, Br, and the angularity of the demagnetization curve deteriorate and the abovementioned magnetic properties are not attained. The heat treatment temperature must therefore be 500° C. to 700° C. Moreover, the heat treatment temperature for maximizing the magnetic properties depends on the composition.

In heat treatment, the atmosphere is preferably an inert gas atmosphere of argon gas or $N_2$ gas or vacuum of 1.33 Pa or less in order to prevent oxidation. The magnetic properties are not dependent on heat treatment time, but Br tends to drop slightly over the passage of time if heat treatment is longer than six hours. Therefore the heat treatment time is preferably less than six hours.

Continuous casting methods using single cooling rollers or double rollers can be employed in the casting process for the alloy melt. When the thickness of the cast alloy exceeds 300 μm, the magnetic properties of iHc≧2 kOe and Br≧10 kG cannot be attained because of the precipitation of coarse α —Fe and $Fe_2B$, on the order of several hundred nanometers. Moreover, when the thickness of the cast alloy is 70 μm or less, the crystal structure in the cast alloy is reduced and the amorphous phase increases. This makes it necessary to crystallize the amorphous phase using heat treatment. The heating for the crystallization of the amorphous phase increases the temperature of the alloy; this heating of the alloy directly after quenching causes grain growth in the already precipitated crystal structure. The result is a metal structure having mean grain diameters greater than the 10 nm to 50 nm mean grain diameters necessary to attain the magnetic properties of iHc≧2 kOe and Br≧10 kG. Br of 10 kG or more is therefore not attained. Consequently the casting conditions require that the cast alloy thickness be 70 μm to 100 μm.

In consideration of heat conductivity, the cooling rollers used in the continuous casting process can be made of aluminum alloys, Cu, Fe, brass, W, or bronze. However, Cu or Fe (alloys including Cu or Fe are acceptable) are preferable in view of their mechanical strength and economy. Materials other than those above are not preferable because of poor heat conductivity; they cannot sufficiently cool the alloy melt and the magnetic properties of iHc≧2 kOe and Br≧10 kG cannot be attained because of the precipitation of coarse α —Fe and $Fe_2B$ on the order of several hundred nm.

The following apply when the cooling roller is a Cu roller having a surface roughness characterized by center line roughness Ra≦0.8 μm, maximum height Rmax≦3.2 μm, and mean roughness at ten points of Rz≦3.2 μm. When the peripheral speed of the roller exceeds 10 m/s, the thickness of the cast alloy becomes 70 μm or less, crystal structures included in the cast alloy are reduced, and the amorphous phase increases. When the peripheral speed of the roller is 2 m/s or less, the cast alloy is greater than 300 μm thick. As a result, the magnetic properties of iHc≧2 kOe and Br≧10 kG cannot be attained because of the precipitation of coarse α —Fe and $Fe_2B$ on the order of several hundred nm. Consequently, the peripheral speed of a Cu roller must be within the range of 2 m/s to 10 m/s.

The following apply when the cooling roller is an Fe roller having the same surface roughness as the abovementioned Cu roller. The Fe roller has better wettability for the alloy bath than the Cu roller. Therefore, when the peripheral speed of the roller exceeds 7 m/s, the cast alloy becomes 70 μm or less thick, crystal structures included in the cast alloy are reduced, and the amorphous phase increases. This is not preferable because the magnetic properties of iHc≧2 kOe and Br≧10 kG cannot be attained. Consequently, the peripheral speed for an Fe roller must be in the range of 2 m/s to 7 m/s, and preferably 2.5 m/s to 5.5 m/s.

Furthermore, the following apply in the case of quenching with a pair of rollers, wherein the Fe rollers discussed above are arranged in opposition and the alloy bath is cooled with the two cooling rollers. When the distance between the two rollers is 0.5 mm or greater, the bath passing between the rollers does not contact the cooling rollers and is not cooled, resulting in a metal structure including coarse α —Fe. When the distance between the rollers is 0.005 mm or less, the bath overflows from between the rollers, making continuous casting impossible. Consequently the distance between the two rollers must be in the range of 0.005 mm to 0.5 mm, and preferably 0.05 mm to 0.2 mm.

When the peripheral speed of the two Fe rollers exceeds 8 m/s, the crystal structures included in the cast alloy are reduced and the amorphous phase increases. Also, when the peripheral speed is less than 1 m/s, the magnetic properties of iHc≧2 kOe and Br≧10 kG cannot be attained because of the precipitation of α —Fe and $Fe_2B$ on the order of several hundred nm. Consequently, the peripheral speed of the rollers must be within the range of 1 m/s to 8 m/s, and preferably 1.5 m/s to 5 m/s.

The methods used to finish the continuous thin-film magnet attained in the continuous casting process into a prescribed form include etching, for finishing thin film metal materials manufactured by rolling, and ultrasonic machining. Die cutting with ultrasound is preferable because it is possible to finish a thin-film magnet into a prescribed form without cracking the thin-film magnet.

Also, when manufacturing thin-film magnets with a prescribed form, die cutting results in scraps of thin-film magnet. These can be pulverized and reused as isotropic permanent magnet powder having iHc≧2 kOe and Br≧7 kG. Powder grain sizes are preferably 20 μm to 300 μm for use as magnetic powder for compression-molded, bonded magnets, and 50 μm or less for use as magnetic powder for injection-molded bonded magnets.

The crystal phase of the thin-film magnet according to the present invention comprises a fine crystalline aggregate wherein the mean crystal grain diameter of each component phase is in the range of 10 nm to 50 nm, and wherein soft magnetic $Fe_3B$ compounds and soft magnetic compound phases having α —Fe and $Nd_2Fe_{14}B$ crystal structures coexist within the same structures. When the mean crystal grain diameter of the structures comprising the thin-film magnet exceeds 50 nm, the angularity of the demagnetization curve and Br deteriorate and it becomes impossible to attain magnetic properties of Br≧10 kG. Also, while smaller mean crystal grain diameters are preferable, 10 nm is the lower limit because of the consequent drop in iHc if less than 10 nm.

EXAMPLE 1

The following metals with purities of 99.5% or better were used to form the compositions No. 1–17 in Table 1: Fe, Al, Si, S, Ni, Cu, Co, Ni, Cr, Zn, Ga, Ag, Pt, Au, Pb, B, Nd, Pr, Dy. These were weighed out to form total masses of 30 g, placed in a quartz crucible having an 0.8 mm diameter orifice in the bottom, and melted using high frequency heating in an Ar atmosphere maintained at the quenching pressures in Table 1. After the melt reached a melting temperature of 1300° C., the melt surface was pressurized with Ar gas; at room temperature, the melt was then continuously cast from a height of 0.7 mm on the outer peripheral surfaces of Cu cooling rollers rotating at the peripheral speeds shown in Table 1. Continuous thin-film magnets with a width of 2 mm to 3 mm and thickness of 100 μm to 300 μm were thereby prepared.

FIG. 1 shows a characteristic Cu—K α X-ray diffraction pattern for sample No. 2. As shown in FIG. 1, the thin-film magnet attained was found to have a metal structure wherein $Fe_3B$ compounds and compound phases having α —Fe and $Fe_{14}B$ crystal structures coexist. Also, all of the samples, excluding No. 4, No. 16, and No. 17, had fine crystal structures, wherein the mean crystal grain diameters were 10 nm to 50 nm.

Table 2 shows the magnetic properties of the thin-film magnet attained. These properties were measured by VSM using thin-film magnets with a prescribed form cut into 5 mm disks using ultrasonic machining.

EXAMPLE 2

No. 4, No. 16, and No. 17 in Table 1 had mean crystal grain diameters of less than 10 nm. The thin-film magnets were therefore maintained at 600° C. for ten minutes in Ar gas and heat treated so that mean crystal grain diameters would become 10 nm or more. Table 2 shows the magnetic properties of the thin-film magnets attained. These properties were measured by VSM using thin-film magnets machined to a prescribed form as in example 1. Moreover, Al, Si, S, Ni, Cu, Co, Ni, Cr, Zn, Ga, Ag, Pt, Au, and Pb replaced part of the Fe in each component phase in No. 5 to No. 17.

EXAMPLE 3

For No. 2, No. 3, No. 5, No. 6, and No. 13 in Table 1, an isotropic permanent magnet powder was prepared by pulverizing the scraps of the thin-film magnet in a grinder after die cutting for VSM measurement; grain diameters were 25 μm to 300 μm and mean grain diameters were 150 μm. Table 3 shows the magnetic properties of the magnetic powder measured using VSM.

COMPARATIVE EXAMPLE 1

In the same way as Example 1, a continuously cast alloy was prepared under the casting conditions in Table 1 using Fe, B, and R with purities of 99.5% or better, so as to form the compositions in No. 18 to No. 21 in Table 1. FIG. 1 shows the characteristic Cu—K α X-ray diffraction pattern for the samples attained. As determined from the results of the X-ray diffraction patterns, sample No. 18 was an amorphous alloy which exhibited no magnetic force. Sample No. 19 had a metal structure comprising mainly α —Fe phase. Moreover, the sample No. 20 had a structure comprising α —Fe and $Nd_2Fe_{23}B_3$, being non-magnetic phases; sample No. 21 had a metal structure comprising mainly α —Fe, like in No. 19. Table 2 shows the magnetic properties of No. 18–21 measured with VSM.

TABLE 1

| | | Fe | B | R | M | Peripheral speed m/second | Quenching atmosphere pressure kPa |
|---|---|---|---|---|---|---|---|
| | | | Composition (at %) | | | | |
| Embodiment | 1 | 79.5 | 18.5 | Nd2 | — | 2 | 1.3 |
| | 2 | 78.5 | 18.5 | Nd3 | — | 5 | 1.3 |
| | 3 | 78.5 | 17 | Nd3.5 + Pr1 | — | 3 | 5.0 |
| | 4 | 75 | 20 | Nd4 + Dy1 | — | 7 | 10.0 |
| | 5 | 78 | 15 | Nd4 | Co3 | 2 | 2.0 |
| | 6 | 71.5 | 18.5 | Nd5 | Cr5 | 3 | 3.0 |
| | 7 | 79.5 | 17 | Nd3 | Al0.5 | 4 | 4.0 |
| | 8 | 76.5 | 18.5 | Nd4 | Si1 | 5 | 5.0 |
| | 9 | 69 | 18.5 | Nd4.5 | S1 | 5 | 6.0 |
| | 10 | 76 | 20 | Nd5 | Ni1.5 | 5 | 7.0 |
| | 11 | 75 | 20 | Nd2.5 + Pr1 | Cu1.5 | 4 | 8.0 |
| | 12 | 76.5 | 18.5 | Nd2 + Pr2 | Zn1 | 2 | 9.0 |
| | 13 | 75.5 | 18.5 | Nd2 + Pr3 | Ga1 | 3 | 10.0 |
| | 14 | 76.5 | 18.5 | Nd4 | Ag1 | 3 | 1.3 |
| | 15 | 78 | 18 | Nd3.5 | Pt0.5 | 5 | 2.0 |
| | 16 | 76.5 | 18.5 | Nd4.5 | Au0.5 | 8 | 0.5 |
| | 17 | 75.5 | 18.5 | Nd5 | Pb1 | 10 | 5.0 |
| Comparison | 18 | 78.5 | 18.5 | Nd3 | — | 20 | 1.3 |
| | 19 | 78.5 | 18.5 | Nd3 | — | 5 | 75.0 |
| | 20 | 75.5 | 18.5 | Nd6 | — | 5 | 1.3 |
| | 21 | 86 | 10 | Nd4 | — | 5 | 1.3 |

TABLE 2

| | | Magnetic properties | | |
|---|---|---|---|---|
| | | Br (kG) | iHc (kOe) | (BH)max (MGOe) |
| Embodiment | 1 | 15.0 | 2.0 | 13.5 |
| | 2 | 13.7 | 2.7 | 15.0 |
| | 3 | 11.4 | 4.2 | 14.7 |
| | 4 | 10.3 | 5.0 | 13.2 |
| | 5 | 12.3 | 4.3 | 15.3 |
| | 6 | 10.1 | 6.9 | 12.9 |
| | 7 | 13.4 | 3.0 | 18.7 |
| | 8 | 12.6 | 3.5 | 17.3 |
| | 9 | 12.0 | 4.0 | 17.1 |
| | 10 | 11.5 | 4.4 | 16.6 |
| | 11 | 13.0 | 3.3 | 17.5 |
| | 12 | 12.2 | 3.6 | 16.8 |
| | 13 | 11.6 | 4.5 | 16.9 |
| | 14 | 12.4 | 3.5 | 17.2 |
| | 15 | 12.9 | 3.2 | 17.6 |
| | 16 | 12.1 | 4.1 | 17.2 |
| | 17 | 11.7 | 4.6 | 16.7 |
| Comparison | 18 | — | — | — |
| | 19 | 7.2 | 1.6 | 3.7 |
| | 20 | 6.5 | 0.9 | 0.6 |
| | 21 | 6.5 | 3.7 | 4.2 |

TABLE 3

| | | Magnetic properties | | |
|---|---|---|---|---|
| | | Br (kG) | iHc (kOe) | (BH)max (MGOe) |
| Embodiment | 2 | 11.6 | 2.7 | 8.8 |
| | 3 | 9.7 | 4.2 | 9.6 |
| | 5 | 10.5 | 4.3 | 9.9 |
| | 6 | 8.6 | 6.9 | 8.4 |
| | 13 | 9.9 | 4.5 | 11.0 |

INDUSTRIAL APPLICABILITY

The present invention can provide thin-film magnets with thickness 70 $\mu$m to 300 $\mu$m at low costs. Such thin-film magnets, which could not heretofore be mass produced at low costs in an industrial setting, can contribute to the miniaturization of magnetic circuits and have a cost performance comparable to hard ferrite magnets. This manufacturing is accomplished through continuous casting of an alloy bath a specific composition and comprising low quantities of rare earth elements, under an inert gas atmosphere at reduced pressures of 30 kPa or less, with a single rotating cooling roller or between a pair of rollers at a specific peripheral speed. A continuously cast, thin-film magnet is attained directly thereby. This thin-film magnet has a crystal structure wherein $Fe_3B$ compounds coexist with compound phases comprising $\alpha$ —Fe and $Nd_2Fe_{14}B$ crystal structures; other characteristics include: thicknesses of 70 $\mu$m to 300 $\mu$m, comprising microcrystalline structures with mean crystal grain diameters of 10 nm to 50 nm, having magnetic properties of iHc$\geq$2 kOe and Br$\geq$10 kG, and being able to withstand use as a permanent magnet. Furthermore, in the case where fine structures with mean crystal grain diameters of less than 10 nm are attained, heat treatment is carried out with the object of specific grain growth; the mean crystal grain diameter of each component phase thereby becomes 10 nm to 50 nm and the thin-film magnet attained has magnetic properties of iHc$\geq$2 kOe and Br$\geq$10 kG.

What is claimed is:

1. A method for manufacturing a thin-film magnet with a fine crystal structure, having magnetic properties of iHc$\geq$2 kOe and Br$\geq$10 kG, a thickness of 70 $\mu$m to 300 $\mu$m, and comprising fine crystals with mean crystal grain diameters of 50 nm or less, wherein 90% or more of the crystal structure comprises $Fe_3B$ compounds coexisting with compound phases having $\alpha$ —Fe and $Nd_2Fe_{14}B$ crystal structures, said method comprising the steps of:

continuously casting in an inert gas atmosphere at reduced pressures of 30 kPa or less, on a single cooling roller or between a pair of rollers rotating at a specific peripheral speed, an alloy melt having a composition expressed as $Fe_{100-x-y}B_xR_y$ (R is one or two of Pr, Nd, or Dy) where the symbols x and y satisfy the following values:
$15 \leq x \leq 30$ at %
$1 \leq y \leq 5$ at %.

2. The manufacturing method according to claim 1, comprising the steps of quenching the cast alloy and then heat treating the quenched alloy in a temperature range of 500° C. to 700° C. with the object of crystal growth, when the alloy melt forms fine crystals with mean crystal grain diameters of 10 nm or less.

3. The manufacturing method according to claim 1, including a step of machining the cast alloy by die cutting.

4. A method for manufacturing an isotropic permanent magnet powder having a fine crystal structure having magnetic properties of iHc$\geq$2 kOe and Br$\geq$10 kG, said method comprising the steps of:

continuously casting in an inert gas atmosphere at reduced pressures of 30 kPa or less, on a single cooling roller or between a pair of rollers rotating at a specific peripheral speed, an alloy melt having a composition expressed as $Fe_{100-x-y}B_xR_y$ (R is one or two of Pr, Nd, or Dy) where the symbols x and y satisfy the following values:
$15 \leq x \leq 30$ at %
$1 \leq y \leq 5$ at %, so as to form a thin-film magnet which is 70 $\mu$m to 300 $\mu$m thick, which comprises fine crystals with mean crystal grain diameters of 50 nm or less, and wherein 90% or more of the crystal structure comprises $Fe_3B$ compounds coexisting with compound phases having $\alpha$ —Fe and $Nd_2Fe_{14}B$ crystal structures, die cutting the cast alloy and forming die cutting scraps, and pulverizing the die cutting scraps to mean grain diameters of 3 $\mu$m to 500 $\mu$m.

5. The manufacturing method for a thin-film magnet comprising a fine crystal structure according to claim 1, wherein during casting said single cooling roller rotates at a peripheral speed of 2 to 10 m/s for Cu rollers and 2 to 7 m/s for steel rollers.

6. The manufacturing method for a thin-film magnet comprising a fine crystal structure according to claim 1, wherein said pair of rollers are spaced a distance of 0.005 to 0.5 mm and the peripheral speed thereof is 1.5 to 8 m/s.

* * * * *